E. A. REED.
DOUGH MOLDING MACHINE.
APPLICATION FILED SEPT. 9, 1915.
1,189,868.
Patented July 4, 1916.
3 SHEETS—SHEET 1.
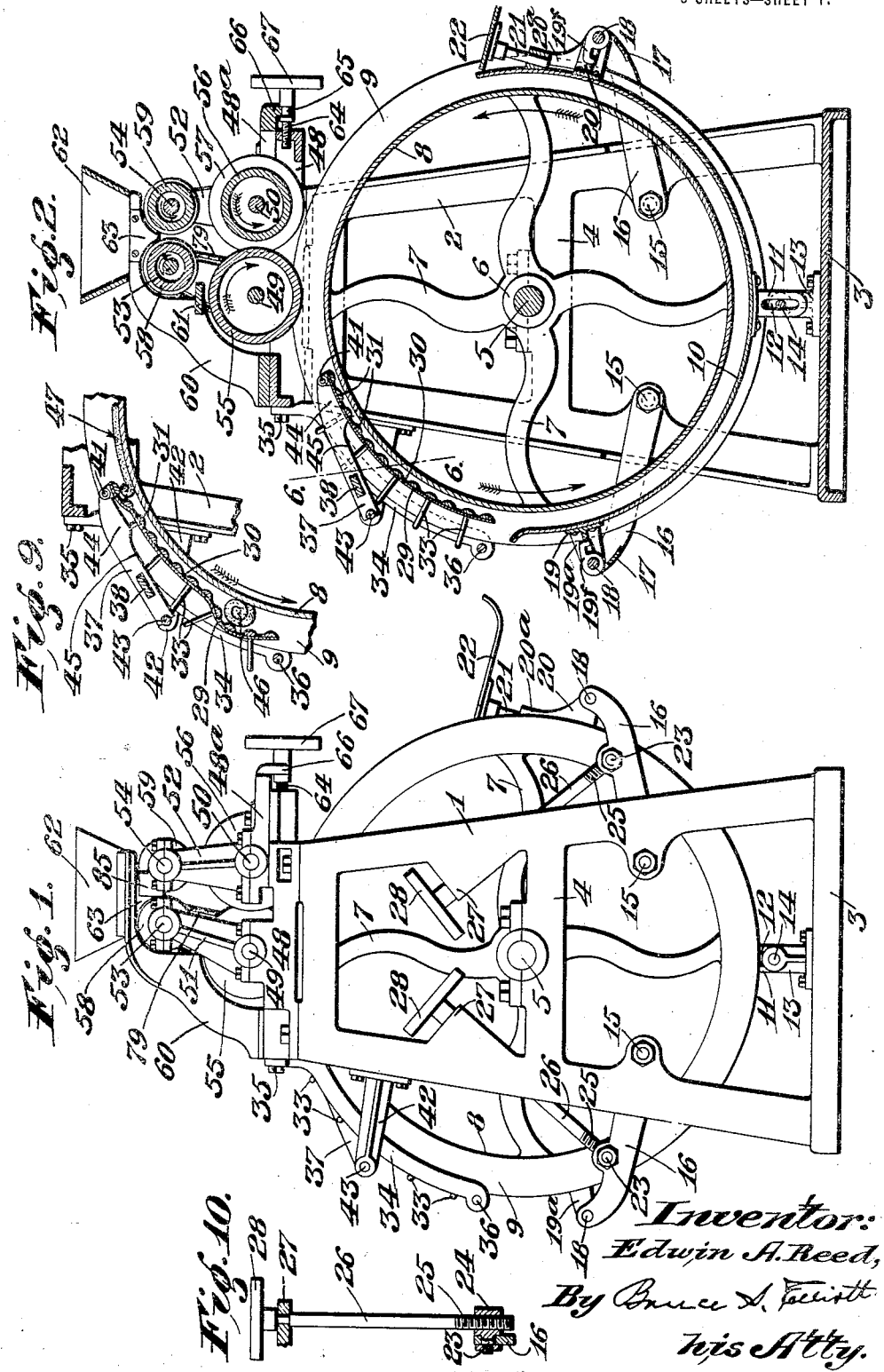
Inventor:
Edwin A. Reed,
By Bruce S. Elliott
his Atty.

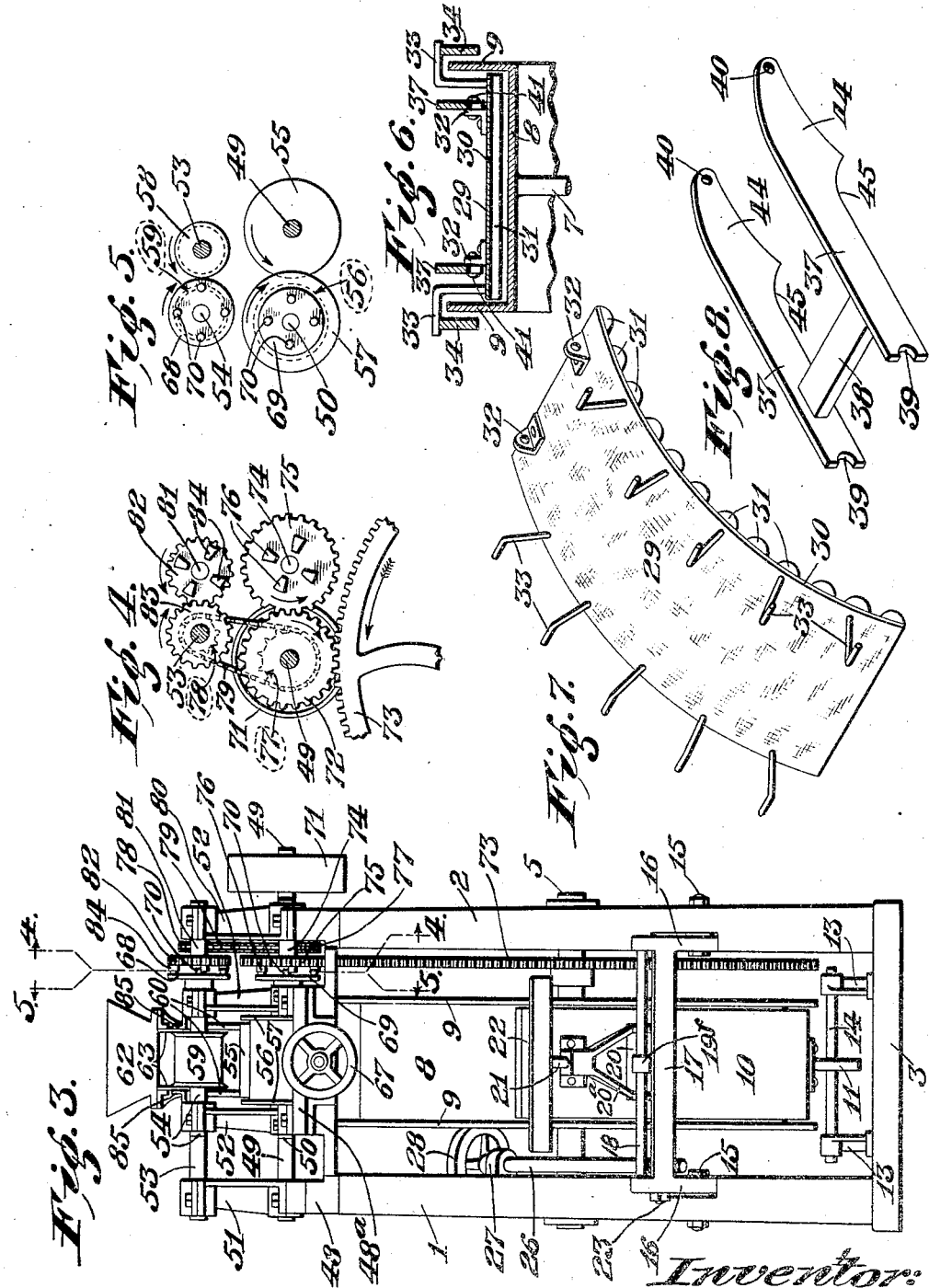

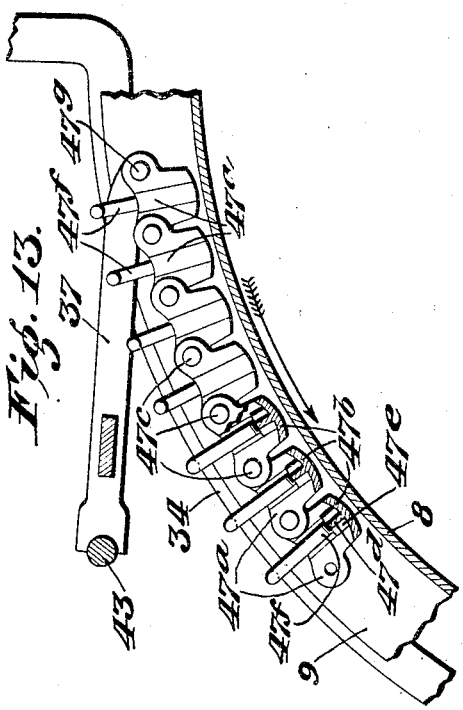
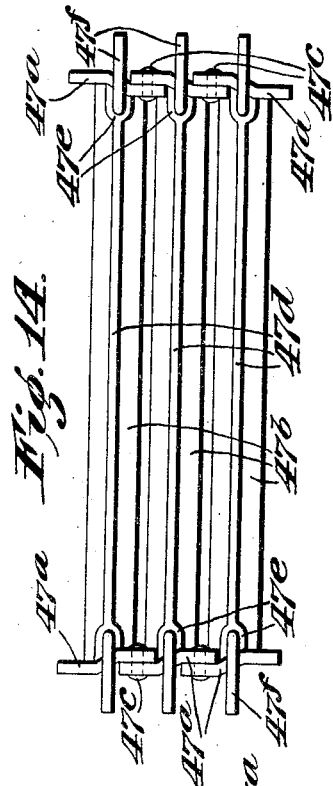
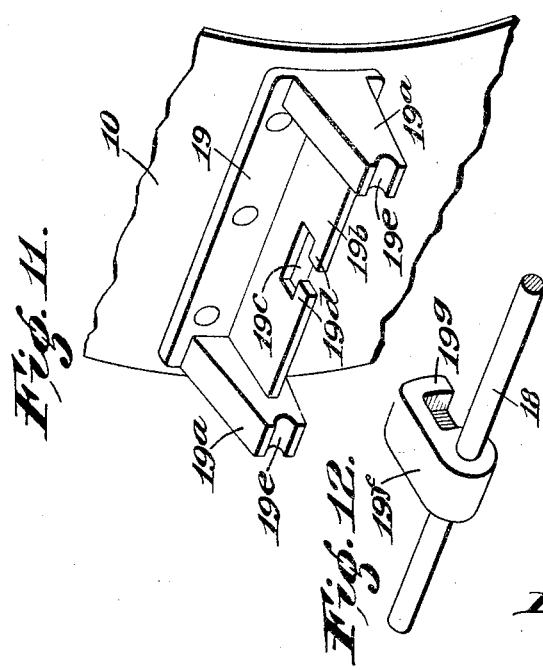
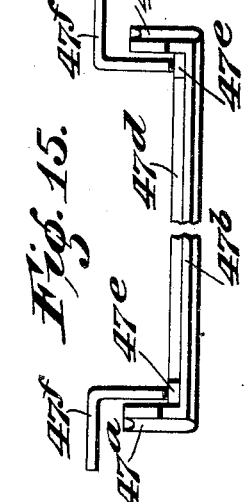

UNITED STATES PATENT OFFICE.

EDWIN A. REED, OF ST. LOUIS, MISSOURI, ASSIGNOR TO DIAGRAPH COMPANY, OF ST. LOUIS, MISSOURI, A CORPORATION OF MISSOURI.

DOUGH-MOLDING MACHINE.

1,189,868.  Specification of Letters Patent.  Patented July 4, 1916.

Application filed September 9, 1915. Serial No. 49,659.

*To all whom it may concern:*

Be it known that I, EDWIN A. REED, a citizen of the United States, residing in the city of St. Louis and State of Missouri, have invented new and useful Improvements in Dough-Molding Machines, of which the following is a specification.

This invention relates to certain new and useful improvements in machines for shaping plastic substances, and has special reference to the provision of improved means for molding and kneading portions of dough to be baked into loaves of bread.

Machines of the general type to which my invention relates are in use, but in all such machines, so far as I am aware, the devices commonly employed for coiling the sheet of dough upon itself to form a roll involve, in one form or another, an element, commonly denominated a "curling plate," which is rigid throughout its length. These curling plates, while capable of yielding bodily to accommodate the increasing width of the roll as the sheet of dough is coiled upon itself, can only in practice act upon one portion or sheet of dough at a time, as it is held too far away from the supporting element, usually a revolving drum, by the thickness of the coil of dough to enable it to act upon a fresh sheet of dough entering between it and the drum. It is therefore necessary that the coiled sheet of dough pass entirely from beneath the curling plate before the latter can act upon a second sheet of dough passed between it and the drum. The capacity of the machine is thus necessarily limited. Again, the solid curling plates frequently exert too great an initial pressure upon the dough by reason of their unyielding character, which results in what is technically known as "punishing" the dough.

It is the general object of my invention to provide a curling element, which I term a "curling apron," to be used in place of the ordinary curling plate, which shall be yielding throughout so that it may exert a gentle pressure upon the dough, and will furthermore be enabled to act upon a coil, or several coils, of dough of the maximum diameter at one portion of its length and at the same time engage the end of a fresh sheet of dough to coil the latter.

A further advantage incident to the use of my flexible curling apron is that owing to its clinging nature it insures the even and complete coiling of the sheet of dough without undue pressure.

Dough molding machines of the type to which my invention relates usually involve the use of a kneading strip or plate partially surrounding a rotatable drum with means for adjusting such kneading plate toward and from the drum to vary the pressure to be exerted upon the coiled roll of dough which is caused to pass between such plate and drum. So far as I am aware, such adjustments of these plates as have heretofore been devised do not permit of separate adjustments of the ends of said plates, but they are adjusted as a whole toward or from the drum.

It is, therefore, a further object of my invention to provide improved means for separately adjusting the end portions of the kneading plate toward or from the drum in order to graduate the pressure to be exerted upon the roll of dough if so desired.

The invention also involves certain novel combinations and operations of parts, and these latter, with the advantages incident thereto, will be fully set forth in the following specification.

In the accompanying drawings,—Figure 1 is a view in side elevation of a dough molding machine constructed according to my invention; Fig. 2 is a central longitudinal sectional view thereof; Fig. 3 is a view in front elevation of the machine; Fig. 4 is a section on the line 4—4 of Fig. 3, and viewed in the direction of the arrows; Fig. 5 is a section on the line 5—5 of Fig. 3, and viewed in the direction of the arrows; Fig. 6 is a section through the curling apron and drum taken on the line 6—6 of Fig. 2; Fig. 7 is a detached perspective view of the curling apron; Fig. 8 is a perspective view of the pivotal support for the apron; Fig. 9 is a detached view of a portion of Fig. 2 showing the curling apron as it appears when acting upon one or more portions of dough; Fig. 10 is a sectional detail view illustrating the connection of an adjusting screw for adjusting the kneading plate; Fig. 11 is a detached perspective view, on an enlarged scale, showing a portion of the kneading plate with a locking bracket secured thereon; Fig. 12 is a similar view showing a pivoted locking dog for coöperation with the locking bracket on the kneading plate; Fig. 13 is a longitudinal sectional view, also on an enlarged scale, through a portion of the drum showing a modified construction of curling apron supported in relation thereto; Fig. 14 is a plan view of a portion of said modified construction of curling apron; and Fig. 15 is an edge view of one of the links thereof.

Referring now to these drawings, the numerals 1, 2, indicate side frame members supporting the working parts of the machine, and which are mounted on a base 3. The frame members 1, 2, provide substantially midway of their height, supports 4 on which are mounted in suitable bearings a shaft 5. Secured on the shaft 5 is a hub 6 from which radiates spokes 7 which support a drum 8. The drum 8 is provided at opposite sides with annular flanges 9, the distance between which determines the length of the roll, or loaf, to be molded.

The numeral 10 indicates the kneading plate which, as shown, surrounds the lower half of the drum 8 at a distance therefrom. Secured on the under side and centrally of the kneading plate 10 is a lug 11 which is provided with a vertically-disposed slot 12. Mounted on the base 3, beyond either side of the drum 8, are two corresponding bracket-members 13 which support in their upper ends a rod or pin 14 which passes through the slot 12; and the latter, working over the bolt 14, serves to guide the movement of the lower portion of the kneading plate, restricting such lower or body portion to movement in substantially a vertical direction as the ends of the kneading plate are adjusted toward and from the kneading drum 8. The construction also permits pivotal movement of the lug 11 about the bolt 14, if such should be caused by the degree of adjustment of the kneading plate. Pivotally mounted at 15 on the frame members 1, 2, are pairs of arms 16 projecting from the front and rear of the machine, respectively, and connected by a cross bar 17. Extending between each pair of arms 16 and secured in the outer ends thereof, is a crossrod 18.

I provide disengageable means for detachably latching the arms 16 to the kneading plate. For this purpose the kneading plate 10 has secured on its under side near one end a bracket 19 provided at opposite ends with outwardly-projecting arms $19^a$ which are connected by a web $19^b$. This web is cut away to form a T-shaped recess $19^c$ which provides two projections $19^d$ directed toward each other. The outer ends of the arms $19^a$ are provided with semi-circular recesses $19^e$ which are adapted to receive the cross-rod 18, and the latter has pivotally mounted thereon a dog $19^f$ which is recessed on opposite sides to provide a substantially annular flange $19^g$ which is adapted to be turned into the recess $19^c$, and to engage behind the projections $19^d$ when the cross-rod 18 is in position in the recesses of the arms $19^a$ and thus lock the kneading plate to said crossrod 18. To release this connection, as when it is desired to remove the kneading plate, it is only necessary to turn the dog $19^f$ upward by hand. The opposite end of the kneading plate to that just described is provided with a locking bracket similar to that just described, as indicated at 20 in Figs. 1, 2 and 3, the bracket 20, however, being provided with an upward extension $20^a$ which is provided with a socket in its upper end to receive a standard 21 which supports a receiving table 22. The arm 16 and cross-bar 17 are preferably, though not necessarily, formed as an integral structure. One bar 16 of each pair has swiveled therein intermediate its ends, as indicated at 23, (see Fig. 10) a stud 24 which is provided with a screw-threaded aperture to receive the screw-threaded end 25 of an adjusting screw 26 which is mounted at its upper end in a bracket member 27 of the frame member 1 in such manner as to be capable of rotation while being prevented from having vertical movement. I prefer to provide means mounted in a fixed position on the frame for independently adjusting the end portions of the kneading plate 10. For this purpose each adjusting screw 26 is provided with a hand-wheel 28 with its hub mounted to rotate in a fixed position in the frame, (see Fig. 10.) By turning either adjusting screw 26 the arms 16 will be raised or lowered, and the corresponding end of the kneading plate 10 brought nearer to or farther from the periphery of the drum 8 according to the direction in which the adjusting screw is turned. It will be apparent to those skilled in the art that this construction will permit of a wide range in, and variation of, the adjustment of kneading plate 10 without particularizing this feature more in detail. In such adjustments the pin and slot connection at the bottom of the kneading plate heretofore described will control the flex of the apron and prevent its bulging unequally on opposite sides of its median line.

I will now describe my improved curling apron, and the manner of mounting the same on the machine, having reference particularly to Figs. 2 and 9, and Figs. 6 to 8, illustrating the preferred form thereof. The curling apron proper is indicated generally by the numeral 29, and comprises a strip of canvas, or other fabric, or flexible material, 30, secured to one side of which and extending transversely thereof in parallel relation from end to end of the strip are a series of rounded strips 31, which may be of wood or metal. The curling apron has secured on its upper side, at what may be termed its forward end, two apertured brackets 32, and secured at intervals along the sides of the apron and projecting upward therefrom, and outward from such sides, are a series of L-shaped supporting arms 33.

The numerals 34 (see particularly Figs. 1, 2 and 6) indicate two corresponding curved supports which are secured at their upper ends to the frame of the machine, as indicated at 35, and are curved concentrically with the flanges 9 of the drum but project slightly above the same and are located outside of said flanges, as indicated more particularly in Fig. 6.

The supports 34 are connected and braced at their lower ends by a cross-rod 36. When in position on the machine the curling apron 29 lies between the flanges 9 with the angle arms 33 resting on the supports 34, thus supporting the curling apron and holding it out of contact with the periphery of the drum 8.

Referring to Fig. 8, the device there shown constitutes a pivotal support and holder for the curling apron, and comprises two side bars 37 rigidly connected toward what may be termed their rear ends by a cross-bar 38. The rear end of each side bar 37 is provided with a semi-circular recess 39, and the forward end of each side bar with an aperture 40. The curling apron support is pivotally connected to the curling apron by means of a bolt 41 passing through the bracket members 32 on said apron, and through the apertures 40 in the ends of the side bars 37, the ends of said side bars being positioned between the brackets 32. Secured on the rear side of each of the frame members 1, 2, are bracket arms 42 which have fixedly secured in their outer ends a rod 43 which extends between them. This rod is adapted to be engaged by the recesses 39 in the ends of the side bars 37. The curling apron support thus holds the curling apron in a relatively fixed position on the machine while having a pivotal movement on the rod 43 to permit the forward end of the apron to rise as the dough passes under it.

Referring to Fig. 8 it will be seen that each of the side bars 37 is provided with an enlargement 44 at its forward end, which is of a length sufficient to extend over, say, three of the strips 31 of the curling apron. This construction causes the weight of the forward end of the support to be exerted in operation to resist slightly the upward movement of the first three strips, thus providing a desirable amount of pressure to insure the coiling of the end of the sheet of dough as it passes under the apron. An additional object subserved by this construction is to prevent the first or end strip 31 from falling into contact with the rear end of the sheet of the dough being coiled; i. e., the forward end of the apron will remain elevated until the sheet of dough has completely passed beyond it, then it is permitted to drop again to the original position to receive and act upon a succeeding sheet of dough. The length of the sheet of dough passed to the curling apron must bear suitable relation to the extent of the enlargement 44 to get the best result. To this end the rolls hereinafter referred to for forming the dough into sheets are relatively adjustable, and the length of the sheet of dough can be regulated by the adjustment of said rolls. To the rear of the heads 44 the side bars 37 are reduced in width, as indicated at 45, such reduced portion providing a space which permits of the apron being raised without raising the side bars 37. By this construction, as illustrated in Fig. 9, my improved curling apron will accommodate between it and the drum a coil of dough 46 of the maximum thickness toward its rear end or, in fact, at any point beyond, or to the rear of the heads 44, without in any manner affecting the action of the apron upon a sheet of dough 47 just entering under the forward end thereof.

In the modified construction of curling apron shown in Figs. 13, 14 and 15, I employ a series of pairs of links 47ª, each pair of links being connected at their lower ends by an integral curved crossbar 47ᵇ, the length of each of which is substantially equivalent to the space between the flanges 9 of the drum 8, and adjacent links at each end of the cross-bar 47ᵇ being pivotally connected in the manner of a sprocket chain, as indicated at 47ᶜ. The cross-bars 47ᵇ are provided on their upper side with a central longitudinal strengthening rib 47ᵈ, which at its opposite ends provides threaded sockets 47ᵉ for receiving the screw-threaded ends of angle-arms 47ᶠ which extend over and rest upon the curved members 34 in the same manner as described with reference to the preferred construction of apron, and thus support the cross-bars 47ᵇ at the proper distance from the surface of the drum 8. The forward end of the curling apron is pivotally connected, as indicated at 47ᵍ, to the forward ends of the side bars 37 of the apron holder in like manner as previously described. In this construction, while the kneading surface presented by the cross-bars 47ᵇ is not continuous, yet the operation is substantially the same as with the preferred form of construction previously described, the pivotal connection between the links permitting each cross-bar to yield as a coil of dough passes beneath it, and the curvature of said cross-bars corresponding to the curvature of the strips 31 and yielding substantially the same function.

Mounted on the upper ends of the side frames 1 and 2, and connecting them is a superstructure 48, slidably mounted on which is a support 48ª. Mounted in suitable bearings on the said superstructure and support, respectively, are two shafts 49 and 50. Secured to and extending upward from opposite sides of the superstructure 48, and the slidable support 48ª are corresponding pairs of standards 51, 52 the standards 51 providing at their upper ends bearings for a shaft 53, and the standards 52 providing bearings in their upper ends for a shaft 54. Mounted on the shaft 49 to turn therewith is a roller 55, and mounted on the shaft 50 to turn therewith is a roller 56, which is provided at its ends with annular flanges 57. The rollers 55 and 56 are mounted in parallel relation, the roller 55 being of slightly greater diameter than the roller 56, and being arranged to rotate between the annular flanges 57 on the latter. Mounted on the shafts 53, 54, to turn therewith are corresponding rollers 58 and 59. These rollers, and the rollers 55 and 56, are adapted to be rotated toward each other while being maintained in adjustable separated relation, through mechanism to be later described. Mounted on the rear side of the superstructure 48 are arms 60 which are supported intermediate their ends by a cross-bar 61 extending between the standards 51, said arms being curved to project over the rollers 58 and 59, and having mounted on such projecting portions a hopper 62 for receiving successive lumps of dough to be fed by the hopper between the rollers 58, 59, and 55, 56, which roll the dough into sheet form, as will be understood.

Each of the arms 60 has secured on its inner side above the rollers 58, 59, a pointed plate 63, the pointed portion of which projects downward between said rollers, said plates thus forming guards or stops to prevent the dough from passing over the ends of the rollers. The support 48ª is adjustable to move the rollers 59 and 56 toward or from the corresponding rollers 58 and 55 by means of a screw-threaded shaft 64 which engages in a screw-threaded aperture in a side flange of the superstructure 48, as shown by Fig. 2, and is swiveled, as indicated at 65, in a downwardly-extending flange 66 provided on the front end of the support 48ª. The shaft 64 is provided with a hand-wheel 67 for turning it.

I will now describe the gearing and other mechanism for imparting rotation to the drum 8 and the rollers 55, 56, and 58, 59, referring particularly to Figs. 3, 4 and 5. Fixedly secured on one end of each of the shafts 50, 54, is a disk 68, 69, respectively, each of which is provided adjacent to its periphery and at preferably equi-distant points with a number of outwardly-projecting pins 70, four of such pins being shown on each of the said disks. The shaft 49 extends across the machine and projects from one side thereof, and on this projecting portion is secured a pulley 71 which is adapted to be driven by a belt (not shown). Secured on the shaft 49 inside of the frame member 2 is a gear wheel 72 which meshes with a large gear wheel 73 secured on the shaft 5 on which the drum 8 is also secured. Mounted in a bearing provided, at the right-hand side of the machine, as shown in Fig. 3, on the superstructure 48 is a stub shaft 74 on which is fixedly secured a gear 75 in mesh with the gear 72. The inner face of the gear 75 is provided with a circularly-arranged series of lugs 76 corresponding in number with the pins 70 on the disk 69. The end of the shaft 74 normally lies directly opposite the end of the shaft 50 and when in such position each pin 70 on the disk 69 will engage a corresponding lug 76. The shaft 49 has also mounted thereon a sprocket wheel 77 over which and a smaller sprocket wheel 78 secured on the shaft 53 passes a sprocket chain 79.

The numeral 80 indicates a standard mounted on the superstructure 48 and affording at its top a bearing for a stub shaft 81 which extends parallel with and lies substantially directly above the stub shaft 74. Secured on the stub shaft 81 is a gear 82 which is in mesh with a corresponding gear 83 mounted on the shaft 53. The inner face of the gear 82 is provided with a circularly-arranged series of lugs 84 corresponding in number to the number of the pins 70 on the disk 68. Normally the end of the stub shaft 81 lies directly opposite the end of the shaft 54, and when in such position each pin 70 on the disk 68 engages a corresponding lug 84 on the gear 82. It will be seen that the rotation of the shaft 49 by the pulley 71 will cause the roller 55 to be revolved, and will rotate the drum 8 through the connection between the gear 72 and the gear wheel 73. The rotation of the shaft 49 will also rotate the sprocket-chain 79 which will cause the shaft 53, roller 58 and gear 83 to be rotated, the latter, in turn, rotating the gear 82. As the latter rotate the lugs 84 will engage the pins 70 and rotate the shaft 54, thereby causing the revolution of the roller 59. In like manner as the gear 72 is revolved by the shaft 49, the engagement of the lugs 76 with the pins 70 on the disk 69 will cause the shaft 50 to be rotated, thereby causing the revolution of the flanged roller 56.

The lug and pin connection illustrated in Figs. 4 and 5, and above described, is for the purpose of permitting the rollers 56 and 59 to be adjusted relative to the rollers 55 and 58 without breaking the driving connection. This adjustment, as previously explained, is accomplished by turning the hand-wheel 67 to move the support 48ª carrying the rollers 56 and 59. In such movement the pins 70 on the disks 68 and 69 will, or may, be moved out of engagement with the lugs 76 and 84 on the gears 75 and 82, but as the lugs 76 and 84 will intersect in their movement the imaginary circle bounded by the pins 70 of the disks 68 and 69 it follows that said lugs will at some point in their movement engage the corresponding pins of the said disks and rotate the latter, although not of course in a strictly continuous manner. As a matter of fact, the lugs 76 and 84 present a sufficiently wide bearing surface for the pins to permit of considerable movement of the shafts 50 and 54 toward or away from the shafts 49 and 53 without carrying the pins 70 out of contact with the said lugs. Under any circumstances, in actual use the movement of the pins beyond the lugs will not be sufficient to modify to any great extent the continuous rotation of the shafts 50 and 54. In the movement of the roller 59 outward a space will be provided between said roller and the pointed plate 63 which would allow the escape of the dough. To obviate this I mount on the bearing of the shaft 54 a plate 85 (see Fig. 1) which extends parallel to the plates 63 and in slidable engagement therewith so as to cover the opening formed by the movement of the roller referred to.

The parts being in motion by power derived from the driving pulley 71, a portion of dough placed in the hopper 62 will pass between the rollers 58 and 59, and then between the rollers 55 and 56, the arrangement of gearing being such that the latter rollers will have a greater surface speed of rotation than the rollers 58 and 59. This construction results in the lower set of rollers imparting a slight pull to the dough, which is desirable as a part of the kneading operation, and also as preventing the dough from slacking and doubling upon itself between the upper and lower rollers. As the sheet of dough passes from between the lower rollers its end engages the surface of the drum 8 and is carried into engagement with and under the end of the curling apron 29, as illustrated in Fig. 9, and in the continued movement thereof caused by the rotation of the drum 8 the sheet of dough will be coiled upon itself, due to contact with the said curling apron, and as illustrated at 46 in said Fig. 9. The ribs 31 greatly facilitate this coiling operation by preventing any sliding movement of the dough over the under surface of the curling apron. As the coil of dough passes from under the curling apron it enters the space between the kneading plate 10 and the drum, and is carried around while being constantly rolled, and is then delivered on the receiving table 22 in the usual manner. As heretofore described, the kneading plate 10 may be adjusted through the medium of the adjusting screws 26 to vary the extent of pressure of the kneading plate on the dough, or to graduate such pressure in a manner that will be well understood by those skilled in the art.

One of the advantages arising from the use of the pin 14 and the slot 12 is that I am enabled to use different sized drums and different sized kneading plates on the same frame of machine without entailing any change of dimensions or alterations of the pin and slot. If a smaller or larger drum is used, a smaller or larger kneading plate can be readily substituted for the one in use. Evidently, also, such a substitution of different sized parts can be effected without placing the kneading plate and drum out of alinement with each other.

I claim:

1. In a dough molding machine, in combination with a movable member, a flexible inelastic curling element coöperating therewith, having one fixed end and being unattached throughout the remainder of its length.

2. In a dough molding machine, in combination with a rotatable drum, a flexible inelastic curling element coöperating therewith, having one end fixed and being unattached throughout the remainder of its length.

3. In a dough molding machine, in combination with a rotatable drum, a flexible inelastic curling element yieldably supported in coöperative relation thereto, and having a fixed end and a free end portion.

4. In a dough molding machine, in combination with a rotatable drum, a flexible curling element pivotally supported in coöperative relation thereto.

5. In a dough molding machine, in combination with a rotatable drum, a flexible curling apron supported out of contact with said drum, and a pivotal holder for said apron.

6. In a dough molding machine, in combination with a rotatable drum, supports located beyond either end of said drum, a flexible curling apron, hangers thereon resting on said supports, and a holder for said apron.

7. In a dough molding machine, in combination with a rotatable drum, supports located beyond either end of said drum, a flexible curling apron, hangers thereon resting on said supports, and a pivotal holder for said apron.

8. In a dough molding machine, in combination with a rotatable drum, supports located beyond either end of said drum and having bearing surfaces concentric with and projecting above the drum, a flexible curling apron, hangers located at either side of said apron and resting upon said supports, and a pivotal holder for said apron.

9. In a dough molding machine, in combination with a rotatable drum provided with flanges at either end, a pair of supports mounted on the machine beyond the respective flanges and having bearing surfaces concentric with and extending above said flanges, a flexible curling apron located in the space between the flanges of said drum and provided at either side with hangers resting on said supports, and a pivotal holder for said apron.

10. In a dough molding machine, in combination with a rotatable drum, a flexible curling apron supported in coöperative relation thereto, and a holder for said apron connected to the forward end thereof and pivotally mounted on the machine.

11. In a dough molding machine, in combination with a rotatable drum, a flexible curling apron supported in coöperative relation thereto, and a holder for said apron connected to the forward end thereof and pivotally mounted on the machine, said holder providing a head for engaging the upper surface of the apron at its forward end and beyond said head having a reduced portion to provide a space for the free upward movement of said apron.

12. In a dough molding machine, in combination with a rotatable drum, a flexible curling element supported in coöperative relation thereto and comprising a series of parallel transversely-disposed members, and a holder connected to the forward end of said curling element and pivotally mounted on the machine, said holder providing a head adapted to engage over a plurality of said transverse members at the forward end of said curling element, and beyond said head having a reduced portion to provide a space for the free upward movement of said curling element.

13. In a dough molding machine, the combination of a frame, a rotatable drum supported thereby, a kneading plate mounted in coöperative relation with said drum, a pair of arms pivotally mounted on said frame, disengageable latching means for attaching said arms respectively to said kneading plate near each end thereof, and a hand operated adjusting member connected with each of said pivotally mounted members for moving the same to adjust either end of said kneading plate independently of the other.

14. In a dough molding machine, in combination with a rotatable drum, a kneading plate partly surrounding said drum, arms pivotally mounted on the machine and supporting opposite end portions of said kneading plate, adjusting members for separately raising and lowering each of said arms to regulate the distance of the end portions of said kneading plate from said drum, said adjusting members constructed to be adjustable while the machine is in operation, and a pin and slot connection between the bottom of said kneading plate and the machine, said slot being vertically disposed.

15. In a dough molding machine, in combination with a rotatable drum, a kneading plate partly surrounding said drum, pivotal members mounted on either side of the machine and detachably associated with opposite end portions of said kneading plate to support the same, and locking members carried, respectively, by opposite ends of said kneading plate and by said pivotal members, one of said locking members of each set being pivotally mounted and adapted to be turned into detachable locking engagement with the other locking member.

16. In a dough molding machine, in combination with a rotatable drum, a kneading plate partly surrounding said drum, pivotal members mounted on either side of the machine and detachably associated with opposite end portions of said kneading plate to support the same, locking members carried, respectively, by opposite ends of said kneading plate and by said pivotal members, one of said locking members of each set being pivotally mounted and adapted to be turned into detachable locking engagement with the other locking member, and adjusting members for raising and lowering said pivotal members to regulate the distance of the end portions of said kneading plate from said drum.

17. In a dough molding machine, in combination with a rotatable drum, a kneading plate partly surrounding said drum, a pair of pivotal members mounted on either side of the machine, a rod connecting each pair of said members, brackets connected to opposite end portions of said plate, said brackets having recessed members for engaging said rods and providing locking recesses, a locking dog pivotally mounted on each of said rods and adapted to be turned into engagement with the locking recess of a corresponding bracket, and adjusting members for raising and lowering said pivotal members.

18. A device for use in dough molding machines comprising a detachable support, and a flexible inelastic curling apron secured at one end thereto and having the remainder of its body unattached.

19. A curling apron for dough molding machines comprising a strip of flexible inelastic material provided with transverse parallel ribs.

20. A device for use in dough molding machines comprising a support, and a flexible inelastic curling apron secured at one end thereto and provided on its under side with transverse parallel ribs.

21. A curling apron for dough molding machines comprising a strip of flexible material provided on its under side with transverse parallel ribs and on its upper side with a series of hangers.

In testimony whereof, I have hereunto set my hand.

EDWIN A. REED.